United States Patent [19]

Mazur et al.

[11] Patent Number: 4,968,393
[45] Date of Patent: Nov. 6, 1990

[54] MEMBRANE DIVIDED AQUEOUS-NONAQUEOUS SYSTEM FOR ELECTROCHEMICAL CELLS

[75] Inventors: Duane J. Mazur; Norman L. Weinberg, both of Amherst, N.Y.

[73] Assignee: A. L. Sandpiper Corporation, Columbus, Ohio

[21] Appl. No.: 182,907

[22] Filed: Apr. 18, 1988

[51] Int. Cl.⁵ .................................. C25B 3/00
[52] U.S. Cl. ........................ 204/59 R; 204/72
[58] Field of Search .............. 204/59 R, 73 R, 72, 204/131; 429/101, 105, 109

[56] References Cited

U.S. PATENT DOCUMENTS

| | | | |
|---|---|---|---|
| 1,323,879 | 12/1919 | Libby | 429/101 |
| 3,531,328 | 9/1970 | Bro et al. | 429/145 |
| 4,365,009 | 12/1982 | Grimes et al. | 429/50 |
| 4,367,266 | 1/1983 | Kalnoki-Kis | 429/101 |
| 4,400,448 | 8/1983 | Einstein et al. | 429/34 |
| 4,452,868 | 6/1984 | Gibbard et al. | 429/21 |
| 4,468,441 | 8/1984 | D'Agostino et al. | 429/105 |
| 4,510,218 | 4/1985 | Ando et al. | 429/198 |
| 4,581,114 | 4/1986 | Morris et al. | 204/267 |
| 4,659,443 | 4/1987 | Byker | 204/131 |
| 4,702,804 | 10/1987 | Mazur et al. | 204/73 R |
| 4,784,924 | 11/1988 | Savinell et al. | 429/105 |

OTHER PUBLICATIONS

Sarrazin, J., et al., J. Electroanal. Chem., 137 (1982) 183-188.
Raoult, E., et al., J. Appl. Electrochem., 14 (1984) 639-643.
Raoult, E., et al., J. Appl. Electrochem., 15 (1985) 85-91.

Primary Examiner—John F. Niebling
Assistant Examiner—Steven P. Marquis
Attorney, Agent, or Firm—Howard M. Ellis

[57] ABSTRACT

Ion exchange membrane divided electrochemical cells with a system of separated heterogeneous aqueous-/nonaqueous electrolytes provide improved performance in both energy consuming and energy producing electrochemical processes by more effectively restricting the transmission of neutral molecules between cell compartments and by isolating reactions occuring at the working and counter electrodes.

9 Claims, 2 Drawing Sheets

MEMBRANE DIVIDED AQUEOUS-NONAQUEOUS SYSTEM FOR ELECTROCHEMICAL CELLS

BACKGROUND OF THE INVENTION

The present invention relates to methods for synthesis and separation of chemical compounds electrochemically, methods for generation of electrical energy, including electrochemical cells for performing such methods.

U.S. Pat. No. 4,702,804 (D. J. Mazur et al.) discloses methods for electrochemical dehalogenation of organic compounds, and particularly the destruction of halogenated aromatic compounds like polychlorinated biphenyls (PCBs) in contaminated silicon oils, transformer oils and other dielectric fluids. The methods of Mazur et al., for example, provide for treating contaminated liquids in extraction and separation zones for removing potentially harmful PCBs with an organic solvent, such as propylene carbonate, cyclopentanone, etc. The recycled dielectric fluid, substantially free of PCBs, can be returned to service while the PCBs in the organic solvent are reduced electrochemically at the cathode of an electrolytic cell. Alternatively, instead of separating the PCBs from the oil the contaminated dielectric fluid may be dispersed in the organic solvent and treated in the electrolytic cell where the PCBs are cathodically reduced to compounds of lesser toxicity, greater disposability and/or reusability.

Although Mazur et al. mention aqueous systems where the catholyte and anolyte may comprise mainly water, PCBs are not readily soluble in aqueous solution. Aqueous systems are also usually less efficient because much of the power for operating the electrochemical cell is expended in electrolysis of water, instead of breaking down the contaminant. Hence, both the catholyte and anolyte, according to Mazur et al. are—nonaqueous—which means they contain less than 5 percent by weight water.

Although the methods of U.S. Pat. No. 4,702,804 are suitable in most instances for lowering PCB levels to less than 1 ppm, it was discovered that in the electrochemical dehalogenation of aromatic compounds, and particularly in the treatment of some PCB contaminated dielectric fluids containing antioxidant/clarifiers, such as (2,6-di-t-butylp-cresol), also known as BHT, the concentration of PCBs is not always lowered to the level desired. It is believed that in a homogeneous, nonaqueous system comprising an organic solvent and an antioxidant, like BHT the antioxidant migrates to the nonaqueous solvent on the anode side of the cell where it is oxidized to a quinone compound. This newly formed compound is able to re-enter the cathode side of the cell where it competes with the PCBs for reduction sites at the cathode. The passage of such competing compounds between the anode and cathode compartments is able to occur notwithstanding the presence of a cell divider, e.g. permselective ion exchange membrane, which is suggested by Mazur et al. In addition, it is believed that biphenyl, an electrically neutral compound formed at the cathode during reduction of the PCBs, can also pass through such cell dividers and into the anolyte where in the presence of chlorine becomes rechlorinated back to toxic chlorinated biphenyls.

While the processes of U.S. Pat. No. 4,702,804 provide for important improvements in dehalogenation reactions through carbon cathodes of greater stability to electrochemical corrosion, the migration of neutral molecules between anode and cathode compartments even in the presence of a cell divider often fail to prevent unwanted side reactions from occuring at electrodes due to a lack of isolation of reactions occuring at one from those occuring at the other. This can result in poor operating efficiencies. Accordingly, a principal object of the present invention relates to the discovery that a multi-phase or heterogeneous system of solvents as electrolytes in a divided cell equipped with an ion exchange membrane will restrict passage of neutral molecules between cell compartments, more effectively isolating reactions taking place at the cathode and anode thereby improving overall cell performance. Thus, one aspect of the present invention contemplates organic electro-synthesis reactions in which an electrolytic cell equipped with a permselective membrane utilizes a nonaqueous solvent at the working electrode, e.g. cathode, and an aqueous solvent at the counter electrode, e.g anode. In electro-synthesis reactions utilizing the heterogeneous electrolytes, aromatic compounds, for instance, like PCBs in a catholyte comprising a nonaqueous solvent are reduced to compounds of lesser toxicity, e.g. biphenyl and chloride ions. The biphenyl in the nonaqueous catholyte being an electrically neutral molecule is immiscible in the aqueous anolyte. The solvent interface of the heterogeneous system appears to effectively aid in retaining the neutral biphenyl and any antioxidant present in the cathode compartment with the nonaqueous solvent while an anion exchange type membrane selectively permits the negatively charged chloride ions to freely enter the anolyte compartment where chlorine is formed, mitigating possible regeneration of toxic PCBs.

Ion exchange membranes possess hydrophobic properties and inherently resist the passage of water molecules between compartments of a divided cell. In contrast, with an ion exchange membrane neutral organic molecules in a homogeneous nonaqueous system of electrolytes are able to pass more freely between cell compartments. It was discovered that transmission of such neutral organic molecules between compartments can be restricted also by employing the heterogeneous solvent system of the present invention whereby the interface of the aqueous/nonaqueous solvents provides an effective buffer to the transmission of such molecules across the membrane barrier Accordingly, the system of electrolytes comprising an aqueous solvent and a nonaqueous solvent on opposite sides of a permselective membrane of an electrolytic cell offers a broad scope of useful applications in addition to improved methods for organic electrosynthesis, etc. This includes improved methods for conducting separations in both synthesis and degradation reactions in membrane divided electrochemical cells. This may be illustrated where a neutral organic reactant in a nonaqueous solvent is electrolyzed at the working electrode to form new ionic organic molecules. Because only the ionic molecules are able to migrate through the permselective ion exchange membrane to the opposing compartment comprising the aqueous solvent, more effective separation of the ionic and neutral molecules occurs.

In addition to applications of the foregoing dual system of heterogeneous electrolytes in energy consuming cells, i.e. cells requiring the input of electrical energy for synthesis of product, the divided cell system of aqueous-nonaqueous electrolytes is also useful in energy producing cells, e.g. batteries, fuel cells, and the like. Particularly in the case of high energy-density batteries utilizing reactive metals, such as lithium, zinc, etc., where such metals are highly reactive with water. The presence of water at the active metal anode can lead to cell failure and even explosion. Hence, in a membrane divided cell the aqueous-nonaqueous heterogeneous solvent interface of the present invention more effectively restricts potentially dangerous water molecules from entering the anolyte compartment, reducing the safety hazards associated with certain novel energy producing electrochemical cells.

SUMMARY OF THE INVENTION

The present invention relates to methods for organic electrosynthesis comprising the steps of providing an electrolytic cell having an anode in an anode compartment, a cathode in a cathode compartment and a permselective membrane spaced from the anode and cathode; introducing into the anode compartment an anolyte comprising a nonaqueous solvent and an oxidizable organic compound; introducing into the cathode compartment a catholyte comprising an aqueous solvent, and impressing a voltage across the anode and cathode to oxidize the organic compound at the anode.

As an alternative embodiment to the foregoing method processes for organic electrosynthesis may be conducted by introducing into the cathode compartment a catholyte comprising a nonaqueous solvent and a reducible organic compound; introducing into the anode compartment an anolyte comprising an aqueous solvent, and impressing a voltage across the anode and cathode to reduce the organic compound at the cathode. Included within this latter embodiment are methods of treating inert carrier liquids, such as mineral oils, dielectric fluids like transformer oils; various organic solvents like THF, etc., which may become contaminated with halogenated aromatic compounds like polychlorinated biphenyls. The methods contemplated herein include, for example, prior extraction and separation of the halogenated compound from the inert carrier liquid, or alternatively, the dispersion of the contaminated liquid carrier with the nonaqueous solvent and treatment of the dispersion at the cathode of the electrolytic cell for reduction of the halogented organic compound to substances of lesser toxicity.

For purposes of this invention the expression "nonaqueous solvent" is intended to mean an organic or inorganic liquid or mixtures thereof which are sufficiently ionic to perform as current carriers in electrolytic reactions, or which will support ionization of salts soluble therein and which may comprise up to 5 percent by weight water. The expression "aqueous solvent" for purposes of this invention is intended to mean a liquid comprising mainly water with soluble salts sufficient to support ionization and which may contain up to 10 percent by weight of the components of the nonaqueous solvent.

The present invention also contemplates methods for generating electrical energy comprising the steps of providing an energy producing electrochemical cell equipped with an anode in an anode compartment, a cathode in a cathode compartment and a permselective membrane spaced from the anode and cathode. A nonaqueous solvent is introduced into the anode compartment; an aqueous solvent comprising a redox couple is introduced into the cathode compartment, and the cell is discharged to produce a useful energy output. As an alternative embodiment, the present invention contemplates methods wherein an aqueous solvent is introduced into the anode compartment, a nonaqueous solvent comprising a redox couple is introduced into the cathode compartment, and the cell discharged to produce a useful energy output. The expression "useful energy output" is intended to mean a cell capable of supplying sufficient power to operate the device with which it is being used.

In addition to novel systems for synthesis and separation reactions, the present invention is intended to include various improved high voltage, high energy-density electrochemical cells, such as the alkali metal, e.g. lithium, sodium, potassium; alkaline earth metal, e.g. calcium, magnesium, etc., type oxyhalide cells, like lithium-thionyl chloride and lithium-sulfuryl chloride batteries. In addition to the foregoing batteries the expression "energy producing electrochemical cell" is intended to include zinc/halogen batteries, such as the zinc-chlorine and zincbromine batteries. Included within the meaning of the expression "energy producing electrochemical cell" are both the so called primary nonrechargeable batteries, as well as the rechargeable secondary electrochemical cells.

These and other objects, features and advantages of the invention will become more apparent from the detailed written description below. However, for a further understanding of the invention, reference should first be made to the accompanying drawings taken in conjunction with the detailed written description below wherein.

DETAILED DESCRIPTION OF THE INVENTION

Figure 1:
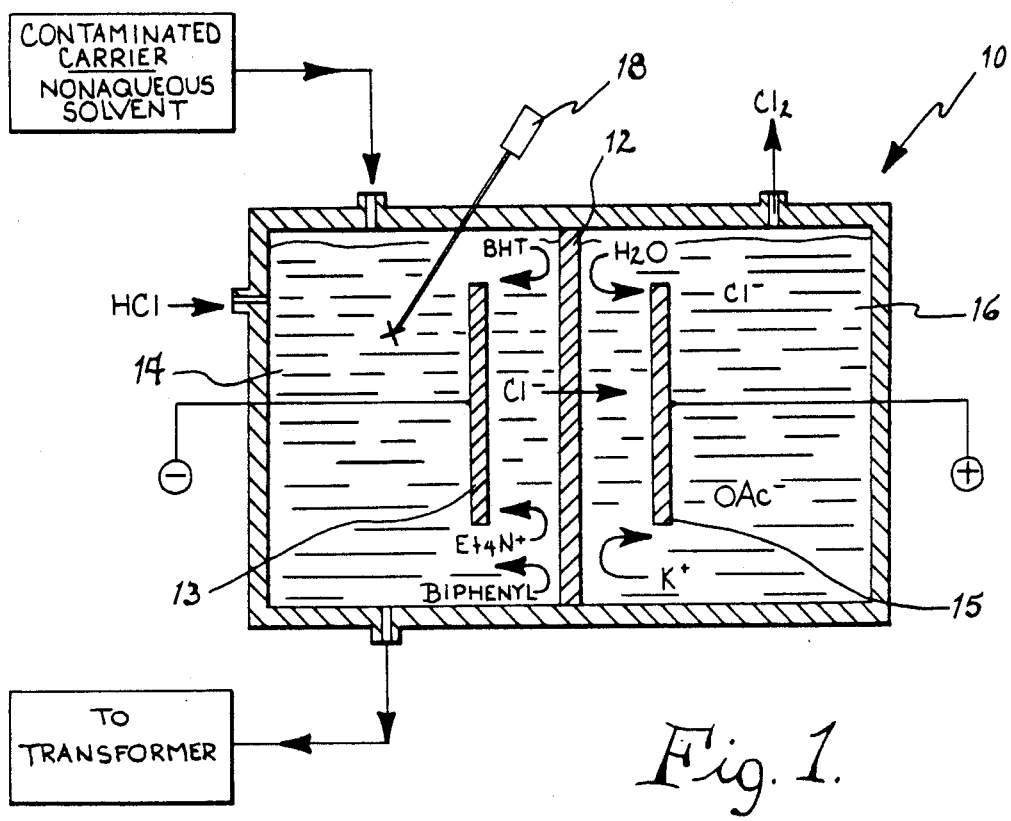
FIG. 1 is a diagrammatic view of a system comprising an energy consuming, divided electrochemical cell with a dual system of heterogeneous solvents as electrolytes in which the catholyte is comprised of a nonaqueous solvent and the anolyte is comprised of an aqueous solvent.

One aspect of the invention relates to improved methods and devices for preparation of organic compounds and their separation by electrochemical means. Such methods and devices substantially eliminate unwanted side reactions by isolating primary reactions at the cathode from those occurring at the anode by restricting the transfer of neutral molecules from between cell compartments. This allows for higher product yields, products of greater purity, improved electrochemical selectivity and higher current efficiencies than comparable methods conducted with homogeneous solvents as electrolytes, i.e. catholytes and anolytes which are comprised of either aqueous or nonaqueous liquids. Accordingly, the concepts disclosed herein have a very broad range of applications in electrochemistry including, but not limited to electrosynthesis reactions for preparing organic compounds, such as solvents like benzylamine, cyclohexanone; dehalogenation reactions, such as mono and polyhalogenated aliphatic compounds like trichlorethylene, carbon tetrachloride, aralkyls, such as substituted benzotri-chlorides, DDT; dehalogenation of aromatic compounds, such as polychlorinated biphenyls (PCBs), mono and polyhalogenated benzenes and phenols. Useful applications also include more efficient purification of inert liquids, such as organic solvents like THF, DMF; mineral oils, transformer oils, silicon oils and other dielectric fluids which have become contaminated with PCBs.

These methods include not only treatment of contaminated solvents and carriers which permit recycling back to service, but also simultaneous destruction of the halogenated contaminant without rehalogenation or other competing reactions taking place. Thus, methods of this invention provide for treatment and destruction of potentially toxic chemical substances to very low levels, i.e. less than 1 ppm. For purposes of this invention—halogen, halogenated and like terms are intended to mean principally chloro, bromo and iodo, and in some instances fluoro. In addition,—dehalogenation—is intended to mean the removal of at least one halogen atom from a mono or polyhalogenated compound.

The foregoing methods are performed in compartmentalized cells, i.e. electrochemical cells divided by means of ion exchange permselective membrane separating the cell into two or more compartments, an anode compartment for housing an anode and a cathode compartment for housing a cathode. The ion exchange membrane depending on intended use may be cationic, anionic or even bipolar. Such ion exchange permselective membranes are commercially available through ordinary channels of commerce, and include such representative examples as the perfluorosulfonic acid cation exchange membranes available from E. I. DuPont under the designation Nafion ®. Suitable representative anion exchange type membranes are also widely available and include those from RAI Corporation under the designation Raipore ®. Other similar performing membranes are also available from Toyo Soda.

For purposes of this invention, in reactions using energy consuming cells electrodes should be spaced from the membrane. Neither the anode nor cathode should be physically engaged with the membrane in accordance with the methods of J. Sarrazin et al., *J. Electroanal. Chem.*, 137(1982) 183–188; E. Raoult et al., *J. App. Electrochem.*, 14(1984) 639–643 and E. Raoult et al., *J. App. Electrochem.*, 15(1985) 85–91. The methods of these workers relate to the use of an organic solvent in one compartment of an electrochemical cell without a supporting electrolyte. To complete the circuit the working electrode is laid flat against the membrane. However, this method results in significant disadvantages, including a reduction in conductivity of the electrolyte leading to limitations in cell operation. For example, their working electrode is limited to two dimensional grids which must be placed up against the membrane Other electrode configurations, like the more efficient three dimensional electrodes of U.S. Pat. No. 4,702,804 cannot be effectively used in the methods of Sarrazin et al. spaced from the membrane because cell voltage will be very high due to IR drop. Neither the whole surface area of the electrode nor the whole surface area of the membrane is available for use when the electrode and membrane are physically engaged with one another. This not only causes the cell to operate at much higher voltages which means greater power consumption, but keeping the electrolyte cool without the occurrence of hot spots becomes more difficult, while the potential for product decomposition increases. The zero gap, nonspaced configuration of the electrode and membrane also results in reduced electrode selectivity because of less control over cell voltage. Thus, according to the present invention, spacing of the electrodes from the membrane and use of appropriate current carriers, particularly in energy consuming cells provide important operating advantages.

As previously indicated, the compartmentalized cells utilize a dual, heterogeneous system of nonaqueous solvents and aqueous solvents as electrolytes. Each may be employed as an anolyte or catholyte depending on the reaction desired. If the catholyte comprises the nonaqueous solvent then the anolyte in the anode compartment will be comprised of the aqueous solvent. In the case of a synthesis reaction, for example, an oxidation reaction at the anode will usually be conducted with an anolyte comprising a nonaqueous solvent and a catholyte comprising an aqueous solvent. Similarly, a reduction reaction at the cathode will be conducted with a catholyte comprising a nonaqueous solvent and an anolyte comprising an aqueous solvent. As a general rule, that compartment having the working electrode, anode or cathode, will contain the nonaqueous solvent and the compartment having the counter electrode will contain the aqueous solvent. In each instance, the objective is to form an aqueous/nonaqueous solvent interface at the ion exchange membrane for purposes of limiting transmission of electrically neutral molecules from the catholyte to the anolyte and vice-versa.

The precise mechanism which appears responsible for more effective limitation on the transmission of neutral molecules through the ion exchange membrane in the dual solvent systems of this invention compared to homogeneous electrolyte solvents, i.e. nonaqueous/nonaqueous solvents or aqueous/ aqueous solvents is not fully understood. Nevertheless, it is believed that although the ion exchange membrane does function as a cell divider, by itself it is relatively inefficient in preventing the transmission of neutral molecules between cell compartments. However, the generally poor miscibility, in most instances, of the aqueous solvent and the nonaqueous solvent provides a solvent interface barrier at the membrane which appears to enhance the efficiencies of the membrane in permitting only the passage of ions of like polarity to that of the membrane.

Suitable nonaqueous solvents include both organic solvents, inorganic solvents and mixtures thereof. Classes of organic nonaqueous solvents are the alcohols, acids, ethers, ketones, nitriles, lactones, cyclic carbonates, and the like. Specific representative examples of suitable members belonging to such classes include the lower aliphatic alcohols like methanol and ethanol. Representative examples of other classes include acetic acid, propionic acid, THF, dioxane, acetone, DMSO, DMF, acetonitrile, propylene carbonate, ethylene carbonate, nitromethane, nitrobenzene, methylene chloride, cyclopentanone, valerolactone, butyrolactone, etc. Suitable inorganic nonaqueous solvents include liquified sulfur dioxide for use in a pressurized cell, ammonia, concentrated sulfuric acid, phosphoric acid. Organic and inorganic nonaqueous solvent mixtures would comprise ammonia and THF, for example.

Nonaqueous solvents, as defined hereinabove, may be sufficiently ionic to perform as current carriers, but may require the addition of soluble salts thereto for purposes of enhancing conductivity. Particularly suitable current carriers which are soluble in nonaqueous solvents are the quaternary ammonium salts like tetraethylammonium chloride, which will also suppress inefficient hydrogen evolution reactions from occurring as a result of the presence of small amounts of water which may be present in the catholyte. Alkali metal and tetralkylammonium salts of fluoride, cyanide, cyanate, tetrafluoroborate and hexafluorophosphate are also probable salts for use in limiting oxygen evolution from the electrolysis of small amounts of water in anolytes which comprise the nonaqueous solvents of the invention.

The aqueous solvent comprises principally water, but may contain up to about 10 percent by weight of the nonaqueous solvent. The aqueous solvent will include almost any soluble and ionizable acid or salt as a current carrier including, for example, mineral acids, alkali metal salts of halides, sulfates, carboxylates, hydroxides, well known quaternary salts, including ammonium, phosphonium and sulfonium salts. Other functionally equivalent salts will be apparent to those conversant in the art.

Selection of electrodes for the electrochemical cells disclosed herein can be critical. For example, because of inherent inefficiencies in ion exchange membranes protons with small amounts of water from solvation (up to 5 percent) may in some instances enter the catholyte comprising nonaqueous solvent from the anode compartment comprising an aqueous solvent. To offset this problem the improved electrochemical cells of the present invention contemplate means for inhibiting or minimizing hydrogen evolution and maximizing conversion efficiencies by utilizing cathode materials which have high overpotential properties. Such cathodes will react with protons at higher thermodynamic potentials than the reduction potential for the reaction desired at the cathode, and therefore, will impede the inefficiencies associated with hydrogen generation. Accordingly, the present invention contemplates cathodes preferably having high overpotentials, such as lead, mercury, copper and other non-noble metals. It should be understood that noble and other precious metal cathodes, such as platinum although less preferred can, nevertheless, be used preferably with the addition of salts, such as the quaternary salts previously discussed which will inhibit the evolution of hydrogen and maximize reduction efficiencies. Alternatively, the present invention contemplates a catholyte circulation system to an external drying bed of conventional design for purposes of removing virtually all water from the nonaqueous catholyte, or for at least maintaining it within the maximum upper 5 percent limitation. Other desirable cathode materials may also comprise carbon and graphite, and particularly the three dimensional partially graphitized carbon cathodes, including graphite felts disclosed in U.S. Pat. No. 4,702,804 (Mazur et al) which possess electrochemically corrosion resistant properties for longer operating inservice life expectancies.

Anodes for the cells of the present invention may be, for example, any of the commercially available dimensionally stable noble metals and other precious metals, like titanium coated with a layer of ruthenium dioxide, platinized platinum anodes, etc. Carbon and other suitable anodic materials can be used. When the anode is the working electrode and the anolyte comprises a nonaqueous solvent it is important to select anode materials on the basis of properties which will limit oxygen evolution. It was found, however, criticality of the anode can be offset by means of the oxygen evolution inhibiting salts, like those previously disclosed hereinabove.

The fundamental inventive concept of an ion exchange membrane divided, aqueous/nonaqueous electrochemical cell system is far reaching, going well beyond the electrosynthesis and separation processes previously described. This is because of the divergence in properties between aqueous and nonaqueous solvents. This may be illustrated by the fact that with aqueous solvents, ionic conductivity and solubility of ionic species are high; whereas in nonaqueous systems they are low. Solubility of organics is generally low in aqueous solvents and high in nonaqueous solvents. Proton and hydroxide concentrations can be high in aqueous solvents and generally low in nonaqueous solvents. Thermal stability is high in aqueous systems, but generally low in nonaqueous systems. Corrosion of component parts is generally higher for an aqueous than a nonaqueous system. Thus, the concept of the present invention has a wide range of useful applications because it provides an effective means for taking advantage of the most desirable properties of both aqueous and nonaqueous solvents in the same electrochemical process simultaneously.

The ion exchange membrane divided, dual aqueous/nonaqueous solvent system is also adaptable to energy producing electrochemical cells, e.g. batteries, fuel cells, and the like. It is particularly advantageous in high energy-density batteries comprising reactive metal anodes, such as zinc, lithium, sodium, potassium, calcium, magnesium, aluminum, etc., and alloys thereof in the nonaqueous solvent, and a useful redox couple at the cathode in the aqueous solvent. The nonaqueous solvent performs as a protective solution for the otherwise highly reactive metal anodes. The aqueous/nonaqueous solvent interface barrier more effectively restricts the transmission of water across the membrane from the catholyte to the anolyte compartment. Thus, the present invention is especially adaptable to various high voltage, high energy-density batteries, such as metal-oxyhalide types like lithium-thionyl chloride, lithium-sulfuryl chloride primary batteries in which thionyl chloride, sulfuryl chloride, etc., is the "liquid cathode" for an electrolyte salt, e.g. lithium tetrachloroaluminate, and cathode depolarizer. Lithium hexafluoroarsenate and lithium perchlorate are also noteworthy as representative examples of electrolytes compatible with nonaqueous solvents like propylene carbonate, etc. Suitable cathodes for such cells include, for instance, carbon, zinc, stainless steel and a platinum group metal. Any of the widely known redox couples are suitable for these batteries systems, including $Cr^{+6}/Cr^{+3}$, $Mn^{+7}/Mn^{+2}$, $Mn^{+4}/Mn^{+2}$, $Mn^{+3}/Mn^{+2}$, $Ce^{+4}/Ce^{+3}$, $Tl^{+3}/Tl^{+2}$, $Co^{+3}/Co^{+2}$, $Te^{+3}/Te^{+2}$, $Br_2/Br^-$ and $Cl_2/Cl^-$.

Other representative examples of primary and secondary energy producing electrochemical cells comprising the membrane divided aqueous/nonaqueous dual system of solvents are the metal/halogen batteries comprising metal anodes like nickel, zinc, magnesium, aluminum, iron and alloys thereof. Suitable cathodes for such cells may comprise carbons, a platinum group metal and alloys comprising a platinum group metal. Metal/halogen batteries are especially adaptable as rechargeable secondary cells having a redox couple in both the anolyte and catholyte compartments. Thus, for example, in a zinc/bromine or zinc/chlorine battery during charging, zinc ions from the aqueous solvent plate out on the electrode which functions as the positive electrode at the charging stage, and a bromide salt in the nonaqueous solvent at the opposite negatively charged electrode is oxidized to bromine, the latter of which is solubilized in the nonaqueous solvent. During discharge of the battery the zinc metal plated out on the cathode(+) during charging becomes the anode(−) and an electron donor. Thus, the zinc metal on the anode goes back into solution as zinc ions, and bromine in the nonaqueous catholyte is reduced to bromide ions.

The following specific examples demonstrate the various aspects of this invention, however, it is to be understood that these are for illustrative purposes only and do not purport to be wholly definitive as to conditions and scope.

EXAMPLE I

A glass laboratory cell 10 diagramatically shown in FIG. 1 was assembled for a dehalogenation reaction. The cell was equipped with an RAI anion exchange membrane 12 dividing it into a cathode compartment 14 and an anode compartment 16. A graphite felt cathode 13 of the type disclosed in U.S. Pat. No. 4,702,804 was installed in cathode compartment 14 and a platinum anode 15 was placed in anode compartment 16. A motorized stirrer 18 was installed in the cathode compartment. Each electrode was spaced from the membrane. Anode compartment 16 was filled with an aqueous solvent comprising 50 ml of 1.0M aqueous potassium acetate. Cathode compartment 14 was filled with a nonaqueous solvent comprising 50 ml of 1.0M tetraethylammonium chloride in propylene carbonate. 50 ml of transformer oil containing BHT and contaminated with 724 ppm PCBs (Arochlor 1260) was added to the nonaqueous catholyte and vigorously stirred to form a dispersion. A silver wire reference electrode (not shown) was inserted into the cathode compartment near the cathode. 700 coulombs of charge was passed at a constant potential of −2.0 volts vs the silver wire. At the conclusion, the catholyte was analyzed by chromatography. The transformer oil had less than 1 ppm of PCBs, and also contained the original BHT and dehalogenated biphenyl by-product. These latter products were not found in the anolyte. Current efficiency was 14.0 percent overall. After settling into separate layers the oil can be drawn off for further use as a dielectric fluid.

EXAMPLE II

To demonstrate a synthesis reaction benzylamine is prepared in an electrochemical cell assembled with an RAI anion exchange membrane, a lead cathode and dimensionally stable anode. A nonaqueous catholyte comprising 10 percent by weight benzonitrile in 0.05M tetraethylammonium hydrogen sulfate in acetonitrile is added to the cathode compartment. An aqueous solvent comprising 1.0M sodium sulfate solution is added to the anode compartment. The cell is operated at a constant current of 50 mA/cm$^2$ until 4 faradays of charge per mole of benzonitrile is passed. Sulfuric acic is added to the catholyte as needed. Benzylamine formed at the cathode remains in the catholyte and is not subject to oxidation at the anode as a result of the ion exchange membrane and the aqueous/nonaqueous interface barrier of the dual electrolyte system preventing transmission of this product to the anolyte compartment.

EXAMPLE III

Figure 2:
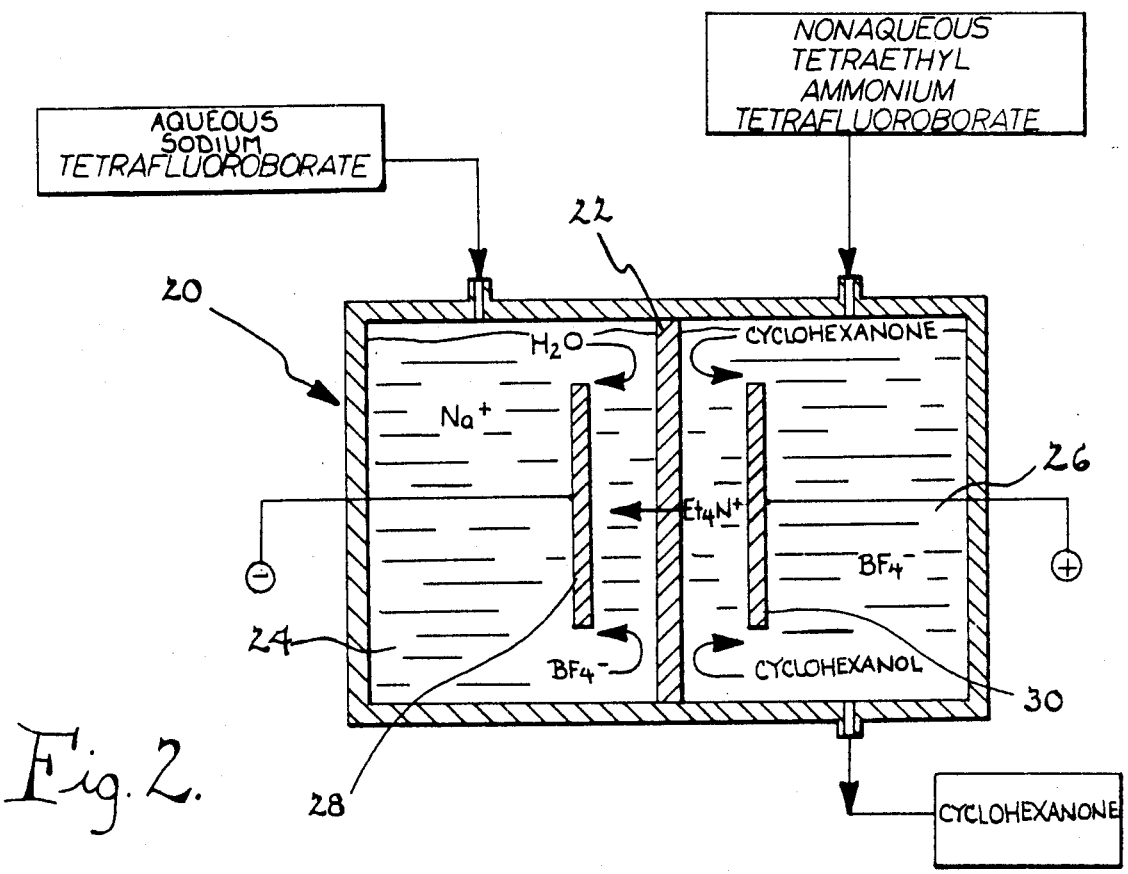
FIG. 2 is a diagrammatic view of a system comprising an energy consuming, divided electrochemical cell with a dual system of heterogeneous solvents as electrolytes in which the anolyte is comprised of a nonaqueous solvent and catholyte is comprised of an aqueous solvent.

To demonstrate an oxidation reaction an energy consuming electrochemical cell 20 is assembled according to FIG. 2. Synthesis of cyclohexanone is carried out in cell 20 by installing an RAI cation exchange membrane 22 dividing the cell into a cathode compartment 24 and an anode compartment 26. A lead dioxide anode 30 and a cathode 28 comprised of titanium oxide available under the name Ebonex ® are installed. An anolyte consisting of a nonaqueous solvent of 0.1M tetraethylammonium tetrafluoroborate in cyclohexanol is added to anode compartment 26. An aqueous sovent of 0.5M sodium tetrafluoroborate in water is added to cathode compartment 24. A potential is set across the electrodes so that a constant current of 20 mA/cm$^2$ is realized. After 2 faradays of charge is passed per mole of cyclohexanol, electrolysis is terminated. Analysis of the catholyte will show that the cyclohexanol and cyclohexanone from the anolyte did not enter the cathode compartment during the process.

EXAMPLE IV

Figure 3:
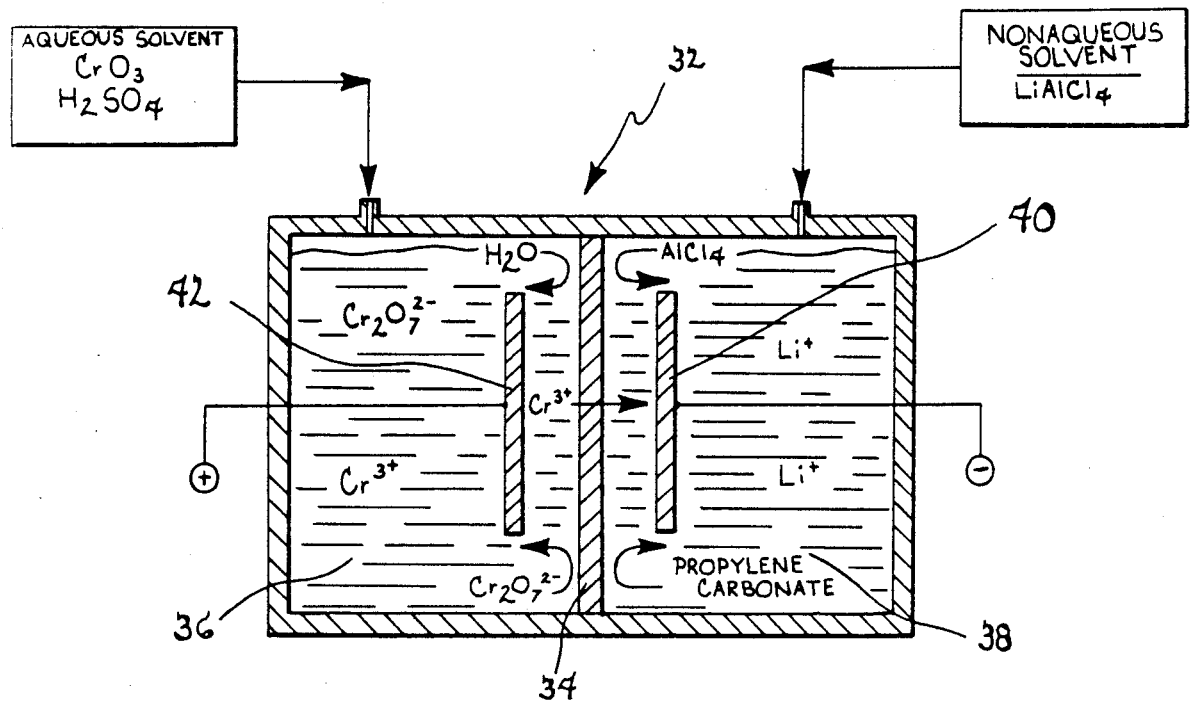
FIG. 3 is a diagrammatic view of a system comprising an energy producing, divided primary electrochemical cell with heterogeneous electrolytes in which the catholyte is comprised of an aqueous solvent and the anolyte is comprised of a nonaqueous solvent.

To demonstrate an energy producing electrochemical cell according to the invention a primary battery 32 is assembled according to FIG. 3. A perfluorosulfonic acid cationic membrane (Nafion) 34 is installed so as to divide the cell into a cathode compartment 36 and an anode compartment 38. Under an inert atomosphere of argon a lithium metal anode 40 and a carbon cathode 42 are assembled in their respective compartments. An anolyte comprising 1.0M lithium tetrachloroaluminate in nonaqueous propylene carbonate is added to anode compartment 38. A catholyte comprising an aqueous solution of 1.0M CrO$_3$ in 1.0M sulfuric acid is added to cathode compartment 36. The battery has an open circuit voltage of 4.37 volts. The cell is operated at a constant load of 50 ohms without significant short term voltage diminution.

EXAMPLE V

Figure 4:
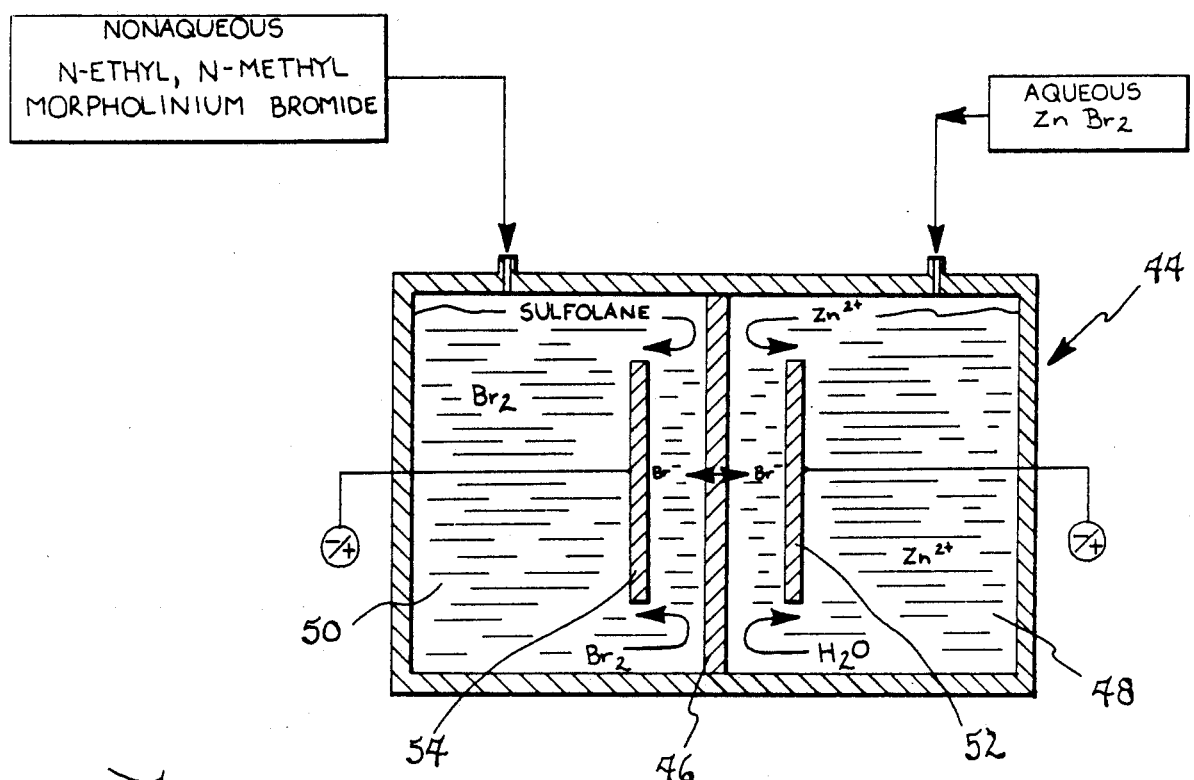
FIG. 4 is a diagrammatic view of a system comprising an energy producing, divided rechargeable electrochemical cell with the dual system of heterogeneous solvents as electrolytes.

A divided rechargeable zinc-bromine battery 44 shown in FIG. 4 is assembled with an RAI anion exchange membrane 46. The anolyte compartment 48 contains a 2.0M aqueous zinc bromide solution and the catholyte compartment 50 a nonaqueous solution of N-ethyl-N-methyl morpholinium bromide dissolved in a minimum amount of sulfolane to create a liquid phase. Anolyte compartment 48 contains a zinc electrode 52 and catholyte compartment 50 a carbon electrode 54. The cell is charged until 50 percent of the zinc ions in the anolyte compartment are plated out on zinc electrode 52 in a reduction reaction. The bromide in the catholyte compartment is oxidized to bromine during charging. Accordingly, during the charging phase electrode 52 performs as a cathode, and electrode 54 as an anode. During cell discharge electrode 52 functions as an anode by generating 2 electrons in the formation of zinc ions; whereas electrode 54 then functions as a cathode. The open circuit voltage for such a cell is 1.8 volts. The cell can be operated at a constant voltage until 80 percent of the plated zinc metal is returned to solution at which point the cell can be recharged.

While the invention has been described in conjunction with specific examples thereof, this is illustrative only. Accordingly, many alternatives, modifications and variations will be apparent to persons skilled in the art in light of the foregoing description, and it is therefore intended to embrace all such alternatives, modifications and variations as to fall within the spirit and broad scope of the appended claims.

We claim:

1. A method for organic electrosynthesis comprising the steps of providing an electrolytic cell having an anode in an anode compartment, a cathode in a cathode compartment and a permselective membrane spaced from said anode and cathode; introducing into said anode compartment an anolyte comprising a nonaqueous solvent, a sufficiently soluble current conducting salt and an oxidizable organic compound; introducing into said cathode compartment a catholyte comprising an aqueous solvent, and impressing a voltage across said anode and cathode to oxidize said organic compound at the anode.

2. The method of claim 1 including the step of introducing a sufficient amount of a oxygen evolution inhibiting salt into the aqueous solvent.

3. The method of claim 1 wherein the permselective membrane is a cation exchange membrane.

4. A method for organic electrosynthesis comprising the steps of providing an electrolytic cell having an anode in an anode compartment, a cathode in a cathode compartment and a permselective membrane spaced from said anode and cathode; introducing into said cathode compartment a catholyte comprising a nonaqueous solvent, a sufficiently soluble current conducting salt and a reducible organic compound; introducing into said anode compartment an anolyte comprising an aqueous solvent, and impressing a voltage across said anode and cathode to reduce the organic compound at said cathode.

5. The method of claim 4 including the step of introducing into said cathode compartment an inert carrier liquid contaminated with a halogenated aromatic compound.

6. The method of claim 5 including the step of introducing a sufficient amount of a hydrogen evolution inhibiting salt into the nonaqueous solvent.

7. The method of claim 6 wherein said inert carrier liquid is a transformer liquid contaminated with a polychlorinated biphenyl.

8. The method of claim 7 wherein said permselective membrane is an anion exchange membrane.

9. The method of claim 8 including the step of forming a dispersion of the contaminated transformer liquid and nonaqueous solvent.

* * * * *